United States Patent [19]

Nagase et al.

[11] 4,202,021
[45] May 6, 1980

[54] FRONT-LOADED CASSETTE TAPE DECK

[75] Inventors: Tetsuo Nagase; Hideo Watanabe; Akira Inomata, all of Tokorozawa, Japan

[73] Assignee: Pioneer Electronic Corporation, Tokyo, Japan

[21] Appl. No.: 921,153

[22] Filed: Jun. 30, 1978

[30] Foreign Application Priority Data

| Jun. 30, 1977 | [JP] | Japan | 52-77234 |
|---|---|---|---|
| Jun. 30, 1977 | [JP] | Japan | 52-77235 |
| Jun. 30, 1977 | [JP] | Japan | 52-77236 |
| Jun. 30, 1977 | [JP] | Japan | 52-77237 |
| Jun. 30, 1977 | [JP] | Japan | 52-77238 |
| Jun. 30, 1977 | [JP] | Japan | 52-77239 |

[51] Int. Cl.$^2$ .................. G11B 15/66; G11B 23/04
[52] U.S. Cl. ................... 360/96.5; 242/198; 360/93
[58] Field of Search ............ 360/96, 93, 94, 132, 360/96.1, 96.5, 96.6; 242/197–200, 191, 75.42, 155 R, 151, 75.3, 75.53

[56] References Cited

U.S. PATENT DOCUMENTS

| 3,904,149 | 9/1975 | Suzuki | 360/96 |
|---|---|---|---|
| 3,980,253 | 8/1974 | Burdorf et al. | 360/96 |
| 3,996,618 | 12/1976 | Suzuki | 360/96 |
| 4,005,487 | 1/1977 | Asai et al. | 360/94 |
| 4,008,490 | 2/1977 | Lemelson | 360/94 |
| 4,071,859 | 1/1978 | Sami | 360/96 |
| 4,107,747 | 8/1978 | Kumaki | 360/93 |

*Primary Examiner*—Alfred H. Eddleman
*Attorney, Agent, or Firm*—Sughrue, Rothwell, Mion, Zinn and Macpeak

[57] ABSTRACT

A front-loaded cassette tape deck which moves the cassette a greater relative distance than the distance travelled by the table. A table is normally in the fully projected position because the force provided by a pair of springs is greater than the frictional forces and the damping forces provided by damping pulleys. A cassette is placed in a slider and is held therein by a leaf spring. As the table is moved towards the closed position, the slider is moved by cords and pulleys at a faster rate than the table. Thus, the slider is moved relative to the table. The greater travel of the slider causes it to be moved within a holder by the sliding engagement of a plurality of guide members. During this time, the holder is at an upper position. When the table reaches the closed position, the slider is fully disposed within the holder. The holder with the slider then automatically rotates to a lower position, which puts the cassette into operational engagement with a cassette driving section. The holder remains in the lower position until an eject lever is depressed, which causes the holder with the slider to be moved back to the upper position. The table then automatically returns to the fully projected position because the force provided by a pair of springs is greater than the frictional forces and the damping forces provided by the damping pulleys. As the table moves towards the fully projected position, the slider is moved out of sliding engagement with the holder and into sliding engagement with the table due to the relative movement of the slider with respect to the table provided by the cords and pulleys.

8 Claims, 8 Drawing Figures

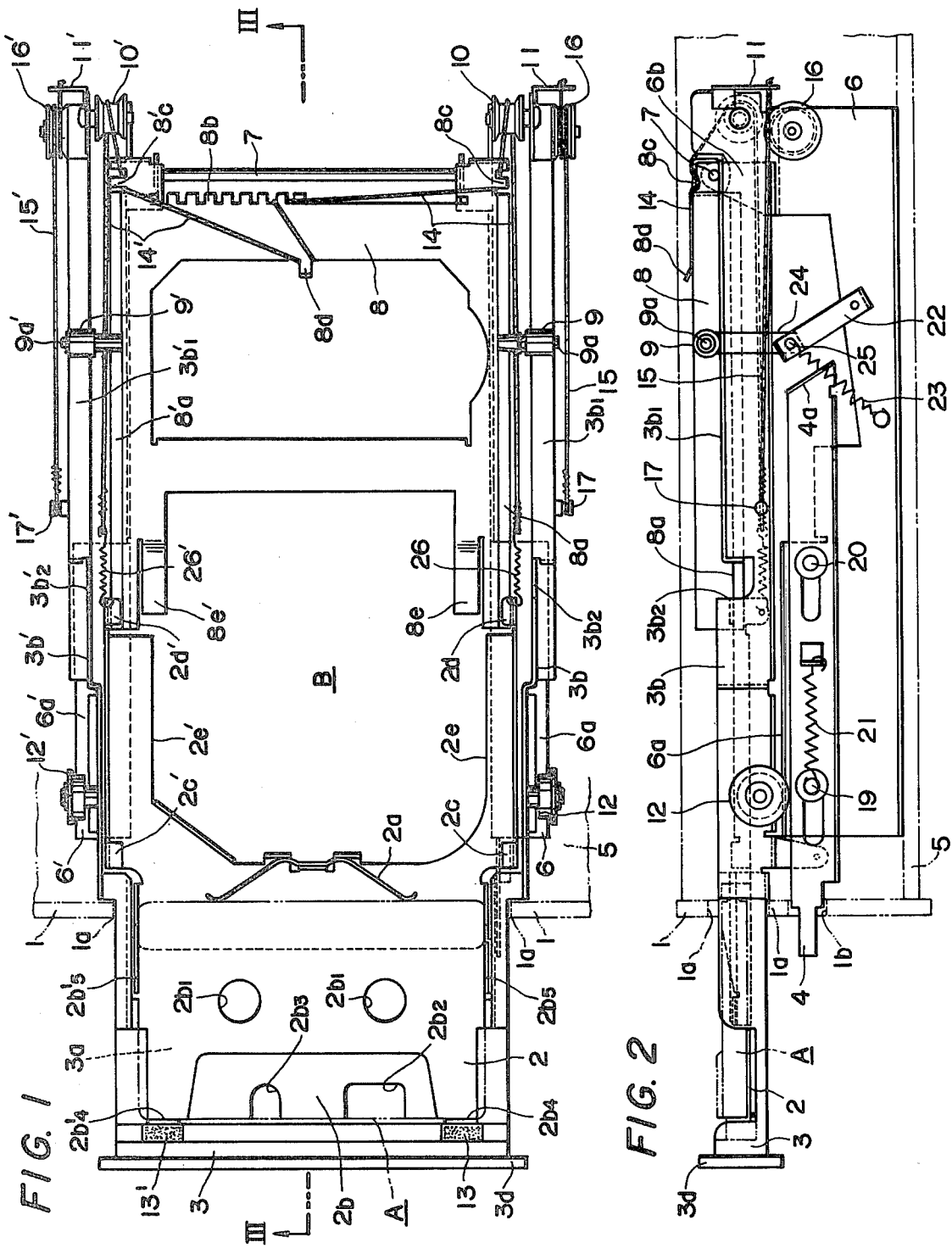

FRONT-LOADED CASSETTE TAPE DECK

BACKGROUND OF THE INVENTION

1. Field of the Invention

The present invention relates generally to cassette tape decks, and more particularly, to front-loaded cassette tape decks.

2. Background of the Invention

Cassette tape decks are well known in the art. A conventional cassette tape deck requires the cassette tape to be loaded in a loading mechanism provided on the top surface of the housing of the cassette tape deck. Such an arrangement thus requires that the user have access to the top surface of the housing. In addition, such an arrangement requires that the user normally keep a top cover on the loading mechanism in the closed position in order to prevent dust and the like from entering the loading mechanism and contaminating the surface of the tape heads and associated electronic circuitry.

In order to overcome the above-noted deficiencies, a front-loaded cassette tape deck has been proposed. However, such a front-loaded cassette tape deck requires that the user insert the cassette deck along the tape side of the cassette into the front-loading mechanism. Such a loading operation is prone to error which results in damage to both the tape cassette and the front-loading mechanism because there is very little surface contact between the tape cassette and the front-loading mechanism during the loading operation. In addition, such a front loading mechanism is prone to dust contamination or the like because the tape heads necessarily must face outwardly and must be disposed with respect to the tape opening a distance equal to or less than the width of the tape cassette.

SUMMARY OF THE INVENTION

The present invention is a front-loaded cassette tape deck which moves the cassette a greater relative distance than the distance travelled by the table. A table is normally in the fully projected position because the force provided by a pair of springs is greater than the frictional forces and the damping forces provided by damping pulleys. A cassette is placed in a slider and is held therein by a leaf spring. As the table is moved towards the closed position, the slider is moved by cords and pulleys at a faster rate than the table. Thus, the slider is moved relative to the table. The greater travel of the slider causes it to be moved within a holder by the sliding engagement of a plurality of guide members. During this, the holder is at an upper position. When the table reaches the closed position, the slider is fully disposed within the holder. The holder with the slider then automatically rotates to a lower position, which puts the cassette into operational engagement with a cassette driving section. The holder remains in the lower position until an eject lever is depressed, which causes the holder with the slider to be moved back to the upper position. The table then automatically returns to the fully projected position because the force provided by a pair of springs is greater than the frictional forces and the damping forces provided by the damping pulleys. As the table moves towards the fully projected position, the slider is moved out of sliding engagement with the holder and into sliding engagement with the table due to the relative movement of the slider with respect to the table provided by the cords and pulleys.

BRIEF DESCRIPTION OF THE DRAWINGS

FIG. 1 is a top plan view of the front-loading cassette tape deck of the present invention with the table 3 and the tape cassette slider 2 in the fully projected or loading position;

FIG. 2 is a right side view of the front-loading cassette tape deck of the present invention, as shown in FIG. 1;

DETAILED DESCRIPTION OF THE PREFERRED EMBODIMENTS

Figure 3:
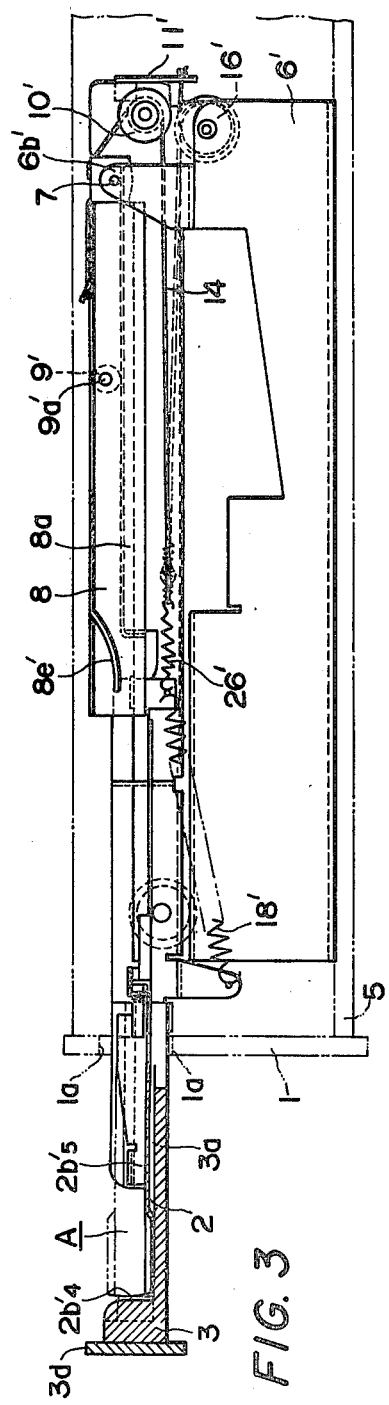
FIG. 3 is a right side cross-sectional side view taken along line III—III of FIG. 1.

Referring now to FIGS. 1 to 6, the front panel of the front-loading cassette tape deck of the present invention is designated generally by the reference numeral 1. Reference numeral 1a designates a first opening provided in front panel 1 through which a table, designated generally by the reference numeral 3, is disposed for sliding longitudinal movement. Reference numeral 1b designates a second opening provided in front panel 1, for example, at a right-hand lower position, through which a first end portion of an eject lever, designated generally by the reference numeral 4, is disposed for longitudinal movement.

Front panel 1 is mounted to a bottom panel 5, for example, at a right angle. With reference to the front view of panel 1, a right side plate, designated generally by the reference numeral 6, and a left side plate, designated generally by the reference numeral 6', are attached to the bottom panel 5, for example, at a right angle. A flanged portion 6a is formed in the top of right side plate 6, and a flanged portion 6a' is formed in the top of left side plate 6'. A shaft support 6b projects from the top, rear portion of right side plate 6, and a shaft support 6b' projects from the top, rear portion of left side plate 6'.

Figure 5:
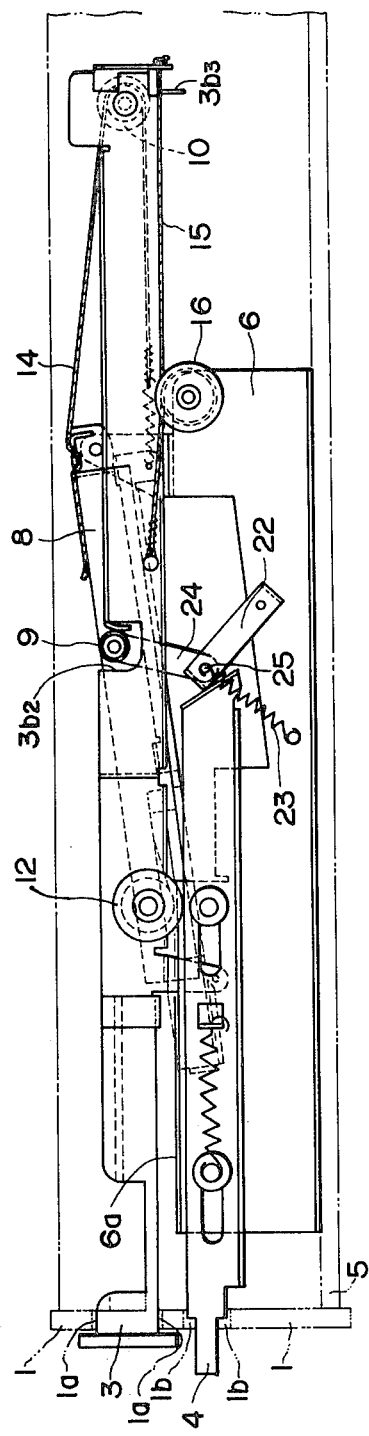
FIG. 5 is a right side view of the front-loading cassette tape deck of the present invention, as shown in FIG. 4.
Figure 6:
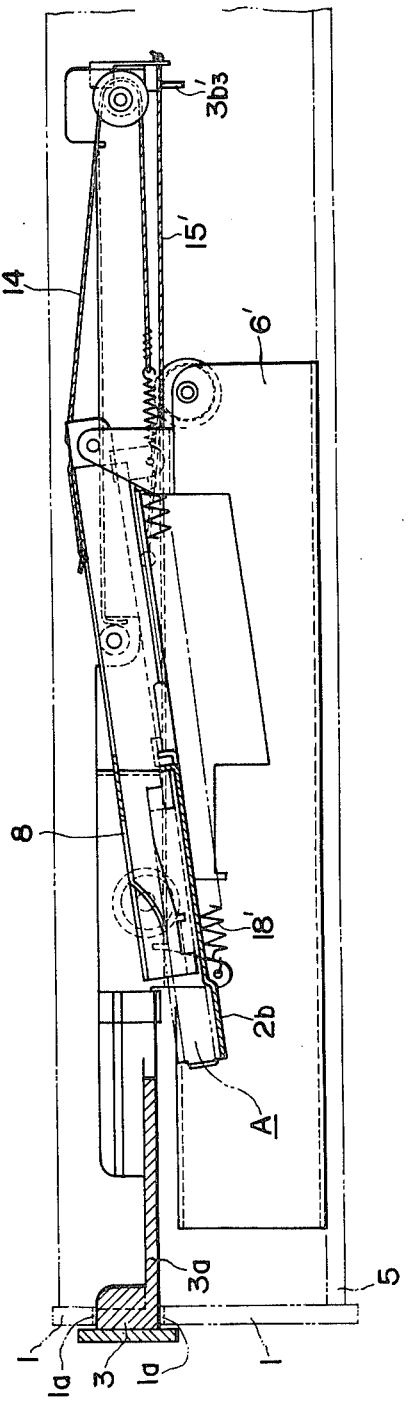
FIG. 6 is a right side cross-sectional view taken along line VI—VI of FIG. 4.

A holder, designated generally by the reference numeral 8, is mounted for rotation at the end furthest from front panel 1 by a shaft 7 rotationally secured at one end to shaft support 6b and at the other end to shaft support 6b'. As is described in detail below, holder 8 rotates between an upper or first position, as shown in FIGS. 2 and 3, and a lower or second position, as shown in FIGS. 5 and 6.

Disposed on the right side of holder 8, facing right side plate 6, is a guide member 8a. Similarly, disposed on the left side of holder 8, facing left side plate 6', is a guide member 8a'. A roller 9 is mounted for rotation by a shaft 9a. Shaft 9a is fixedly secured to the top right side of the holder 8 and disposes roller 9 towards the right side plate 6, as shown best in FIGS. 1 and 4. Similarly, a roller 9' is mounted for rotation by a shaft 9a'. Shaft 9a is fixedly secured to the top left side of holder 8 and disposes roller 9' towards the left side plate 6', as shown best in FIGS. 1 and 4.

Table 3 is provided on its left end, as referenced to the Figs., with a front section 3d. Front section 3d can be any shape, but preferably is a rectangle that is larger than opening 1a. On the bottom surface adjacent front section 3d there is provided a bottom plate 3a, which preferably only extends a small distance to the left of opening 1a when table 3 is in its fully projected or cassette loading position, as shown in FIGS. 1–3. It should be noted that bottom plate 3a is solid and need not be provided with any openings.

Bottom plate 3a of table 3 has a side plate 3b attached to its right side and a side plate 3b' attached to its left side. Side plates 3b, 3b' extend away from front panel 1 in the direction of shaft 7. A flange portion $3b_1$ is formed on the top rear portion of side plate 3b, and a flange portion $3b_1'$ is formed on the top rear portion of side plate 3b'. A cavity $3b_2$ is formed in the center upper surface of side plate 3b and defines the end of flange portion $3b_1$ adjacent front section 3d. Similarly, a cavity $3b_2'$ is formed in the center upper surface of the side plate 3b' and defines the end of flange portion $3b_1'$ adjacent front section 3d'.

Figure 4:
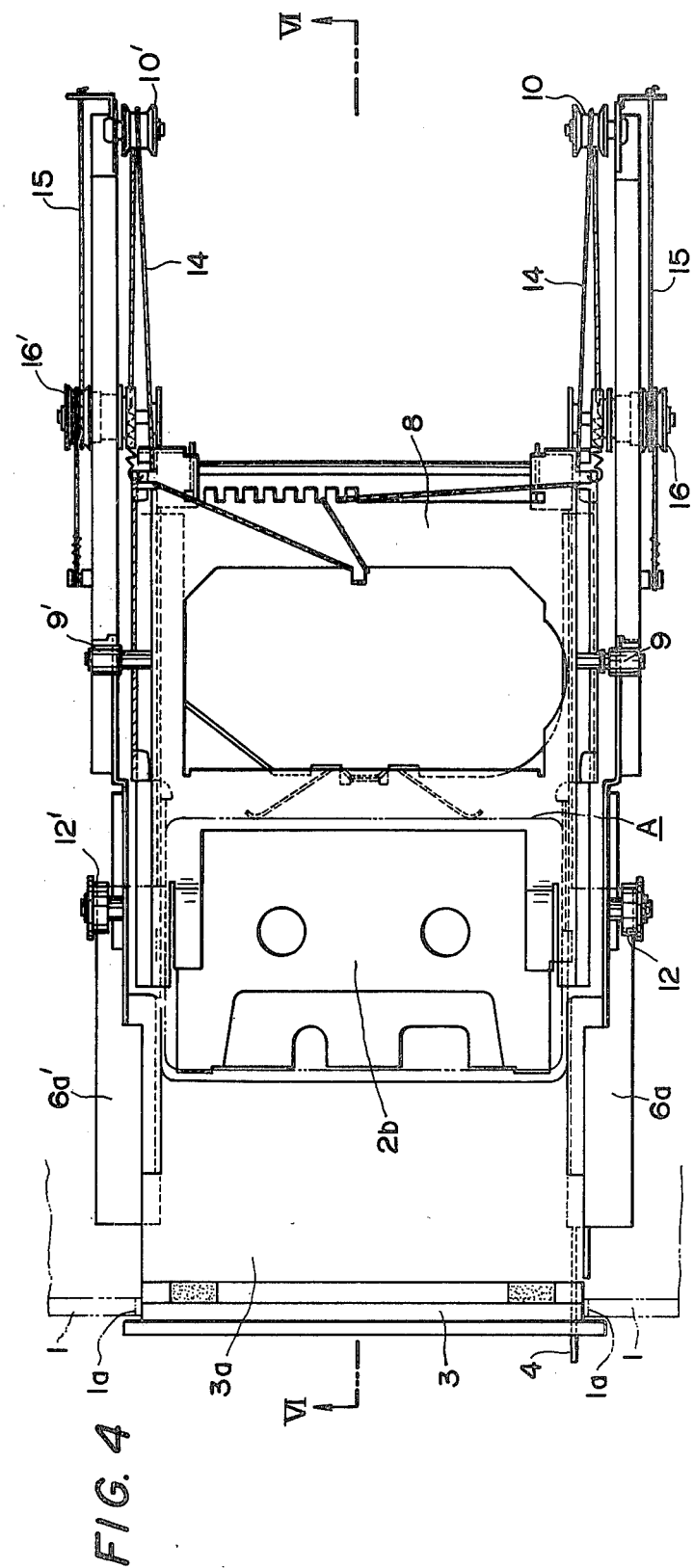
FIG. 4 is a top plan view of the front-loading cassette tape deck of the present invention with the table 3 and the tape cassette slider 2 in the closed or loaded position.

Roller 9 is in rotational contact with flange portion $3b_1$ and roller 9' is in rotational contact with flange portion $3b_1'$. When table 3 is in its fully projected or cassette loading position, rollers 9, 9' are in rotational contact with flange portions $3b_1$, $3b_1'$, respectively, as shown in FIGS. 1–3. As table 3 is moved to the right towards its closed or loaded position, cavities $3b_2$, $3b'_2$ move towards rollers 9, 9', respectively. It should be noted that holder 8 is in its upper or first position, because holder 8 is supported by the rotational engagement between rollers 9, 9' and flange portions $3b_1$, $3b_1'$. When table 3 reaches the closed or loaded cassette position, however, as shown in FIGS. 4–6, rollers 9, 9' drop into cavities $3b_2$, $3b_2'$, causing holder 8 to rotate to its lower or second position.

A guide roller 12 is mounted for rotation on the front side portion of side plate 3b and is in rotational contact with flange portion 6a. Similarly, a guide roller 12' is mounted for rotation on the front side portion of side plate 3b' and is in rotational contact with flange portion 6a'.

A slider, designated generally by the reference numeral 2, is disposed above bottom plate 3a, and is mounted for sliding movement relative to table 3, as is discussed in detail below. When table 3 is in its fully projected or loading position, a cassette setting section 2b of slider 2 is disposed adjacent front section 3d, as shown best in FIG. 1. In this position, standing pieces $2b_4$, $2b_4'$, integral with the cassette setting section 2b, are abutted against buffer rubbers 13, 13' provided along the inner surface of front section 3d. The cassette setting section 2b is dimensioned to accommodate a standard tape cassette A. Specifically, cassette setting section 2b is provided with side pieces $2b_5$, $2b_5'$ and a leaf spring 2a, the tape cassette A is inserted into the volume defined by standing pieces $2b_4$, $2b_4'$, side pieces $2b_5$, $2b_5'$, and leaf spring 2a, and is held therein by the urging of leaf spring 2a. Because tape cassette A is inserted so that the tape portion is adjacent the side defined by standing pieces $2b_4$, $2b_4'$, there are provided in the cassette setting section 2b apertures $2b_1$ into which the reel pins are inserted, and cut-away portions $2b_2$, $2b_3$ where a cassette position regulating pin and a pinch roller are positioned, respectively, when table 3 is at its closed or loaded position.

Slider 2 has a slider plate 2e attached to the right side of the cassette setting section 2b, and a slider plate 2e' attached to the left side of the cassette setting 2b. Slider plates 2e, 2e' extend away from front panel 1 in the direction of shaft 7. Guide members 2c, 2d are provided on the top surface of slider plate 2e, and are bent inwardly so as to slidingly engage guide member 8a of holder 8. Similarly, guide members 2c', 2d' are provided on the top surface of slider plate 2e', and are bent inwardly so as to slidingly engage guide member 8a' of holder 8.

It should be noted at this juncture that when table 3 is moved from the fully projected or loading position to the closed or loaded position, slider 2 is moved a greater distance than the distance travelled by table 3. For example, slider 2 may be moved twice the distance that is travelled by table 3.

The components which move slider 2 relative to table 3 when table 3 is moved between the fully projected or loading position and the closed or loaded position will now be described. A first end of a cord 14 is attached via a spring 26 to guide member 2d. The cord 14 is then passed once around a pulley 10 mounted for rotation on the end of flange portion $3b_1$ and is then hooked on a hook portion 8c of the holder 8. Similarly, the second end of cord 14 is attached via a spring 26' to guide member 2d'. The cord 14 is then passed once around a pulley 10' mounted for rotation on the end of the flange portion $3b_1'$ and is then hooked on a hook portion 8c' of the holder 3. A hook projection 3d and a plurality of teeth 8b are provided on holder 8. After the cord 14 is hooked on the hook portions 8c, 8c', the intermediate portion of the cord 14 is hooked to one of the teeth 8b and is then hooked to the hook projection. Thus, hook portions 8c, 8c', teeth 8b, and hook projection 8d allow the effective length of cord 14 to be changed, which provides the capability of changing the movement of slider 2 relative to table 3 when table 3 is moved between the fully projected or load position and the closed or loaded position.

When table 3 is moved from the fully projected or load position towards the closed or loaded position, cord 14 causes slider 2 via sliding engagement first with the bottom plate 3a and then with guide members 8a, 8a' to be moved towards holder 8 at a greater speed than that of table 3, because of the doubling back of the segments of cord 14 on pulleys 10, 10', whereby slider 2 travels a proportionally greater distance than table 3. When table 3 is in the closed or loaded position, slider 2 is disengaged from table 3 due to the greater distance travelled by slider 2, and is engaged with holder 8 by way of sliding engagement of guide members 8a, 8a' and guide members 2c, 2d, 2c', 2d'.

The lower end of a lever 22 is rotatably secured to side plate 6, and the upper end is rotatably secured by a shaft 25 to the lower end of a link lever 24. The upper end of link lever 24 is connected for rotation to guide roller 9. A first end of a spring 23 is attached to the right side plate 6, and the second end is attached to shaft. As shown in FIGS. 2 and 5, spring 23 is arranged so that it applies a counter-clockwise rotational force to lever 22.

When table 3 is in the closed or loaded position, the weight of holder 8 and of slider 2 (which may include cassette tape A), together with the force provided by spring 23 cause holder 8 to move to the lower or second position because rollers 9, 9' have dropped into cavities $3b_2$, $3b_2'$.

Slider 2 and table 3 are also identified herein as conveying means and auxiliary conveying means, respectively. Furthermore, spring 23 is also identified as a maintaining means for maintaining the slider 2 in the closed or play position.

The force required to be applied to front section 3d to move the table 3 and thus the slider 2 to the closed or loaded position is substantially determined by four forces produced by two different assemblies. The first pair of forces are due to a pair of springs 18, 18'. One end of a spring 18 is secured to a member provided near the end of the right under-side of bottom plate 3a and the other end of spring 18 is secured to the end of the right underside of slider 2 adjacent guide member 2d. Similarly, one end of a spring 18' is secured to a member provided near the end of the left underside of bottom plate 3a and the other end of spring 18' is secured to the end of the left underside of slider 2 adjacent guide member 2d'. Springs 18, 18' are in their normal or unextended positions when table 3 is in the fully projected or loading position. As table 3 moves towards the closed or loaded position, slider 2 is moved a greater and greater relative distance with respect to table 3, which causes springs 18, 18' to provide forces which urge table 3 back to the fully projected or loading position.

The second pair of forces are due to cords 15, 15' and damper pulleys 16, 16'. Referring now to FIG. 2, one end of a cord 15 is attached to a pin 17 fixedly secured to side plate 3b at its intermediate portion. Cord 15 is then wrapped around, for example, once around, a damper pulley 16, mounted for rotation on side plate 6. As is discussed in the embodiments of damper pulley 16 presented below, damper 16 provides a damping force in only one direction of rotation. The other end of cord 15 is attached to a plate 11 fixedly secured to the end of side plate 3b at the point of attachment of pulley 10. Similarly, one end of a cord 15' is attached to a pin 17' fixedly secured to side plate 3b' at its intermediate portion. Cord 15' is then wrapped around, for example, once around, a damper pulley 16' mounted for rotation on side plate 6'. Damper pulley 16' is substantially similar to damper pulley 16. The other end of cord 15 is attached to a plate 11' fixed secured to the end of side plate 3b at the point of attachment of pulley 10'.

The operation of moving table 3 from the fully projected position to the closed position will now be described with respect to damper pulleys 16, 16'. Because the damper pulleys 16, 16' provide damping force only when table 3 is moved from the closed position to the fully projected position, the force required of the user to move the table 3 from the fully projected position to the closed position is not increased.

The operation of moving table 3 from the closed position to the fully projected position will now be described with respect to damper pulleys 16, 16'. Because the damper pulleys 16, 16' provide damping force in only this direction, the force required to move the table 3 from the closed position to the fully projected position is increased. The increase is due to the damping force applied by pulley 16 to the side plate 3b via cord 15 and to the damping force applied by pulley 16' to side plate 3b' via cord 15'. It should be noted that stops $3b_3$, $3b_3'$ provided adjacent leaf springs 11, 11', respectively, limit the travel of table 3 and define the fully projected position.

The eject lever 4 is disposed below table 3, as shown in FIGS. 2 and 5. Eject lever 3 is secured for slidable movement in the longitudinal direction by pins 19 and 20 fixedly secured to side plate 6. A spring 21 is connected at one end to the pin 19 and at the other end to side plate 6 and provides a bias force which urges eject lever 4 to the left to the projected position, as shown in FIGS. 2 and 5. A pressing portion 4a having a shaped surface 15 provided at the end adjacent lever 22.

The operation of the eject lever 4 will now be described. When holder 8 is in the upper or first position, lever 22 is in the upper position, as reference to FIG. 2. As stated above, when table 3 is at the closed position, slider 2 is disposed in holder 8, and holder 8 is in the lower or second position because rollers 9, 9' have dropped into cavities $3b_2$, $3b_2'$, as shown in FIG. 5. The weight of holder 8 and slider 2 (with or without cassette A) together with counter-clockwise rotational force provided by spring 23 is sufficient to keep rollers 9, 9' in cavities $3b_2$, $3b_2'$. When the user desires to return the table 3 to the fully extended position, the user depresses eject lever 4, which causes lever 22 via pressing portion 4a to be rotated clockwise. The clockwise rotation of lever 22 causes rollers 9, 9' to be raised out of cavities $3b_2$, $3b_2'$, which puts holder 8 back to its first position. When the user releases eject lever 4, eject lever 4 returns to its projected position.

It should be noted that the table 3 is automatically moved from the closed position to the fully projected position when the eject lever 4 is depressed. The automatic return is due to the fact that the force provided by springs 18, 18' is made greater than the frictional forces and the damping forces provided by damping pulleys 16, 16'. Of course, the automatic return feature could be replaced with a manual return feature.

It should also be noted that bent pieces 8e, 8e' are provided on the underside surface of both sides of the front portion of holder 8. Bent pieces 8e, 8e' provide a downward pushing force to the cassette A when slider 2 is disposed within holder 8. A cassette driving section B (not shown) having the tape heads and associated tape driving apparatus is positioned below holder 8 and is sloped towards front panel 1 at substantially the same angle that is assumed by holder 8 when it is in its section or lower position. Thus, the cassette A in slider 2 is automatically put into operational engagement with the cassette driving section B when holder 8 moves from its upper position to its lower position. Similarly, the cassette A in slider 2 is automatically removed from operational engagement with the cassette driving section B when holder 8 moved from its lower portion to its upper position. This arrangement of the cassette driving section B substantially overcomes several deficiencies present in conventional front loaded cassette tape loading mechanisms. The tape heads are disposed away from and are not facing opening 1a because slider 2 moves a greater distance than does table 3. High accuracy for placing and removing cassette A from the cassette driving section B is achieved because of the use of slider 2. In addition, the cassette A is in an inclined plane and is not in a vertical plane when it is in operational engagement with the cassette driving section B.

It should be noted that cassette A may be in a substantially horizontal plane when it is in operational engagement with the cassette driving section B if the following modification to the present invention is made (not shown). Two pairs of rollers 9, 9' are provided on holder 8. In addition, shaft 7 is mounted for rotation and for up-down movement in vertical channels provided in shaft support 6b, 6b'. In addition, two cavities $3b_2$, $3b_2'$ are provided. When table 3 is in the closed position, rollers 9, 9' drop into their respective cavities $3b_2$, $3b_2'$, causing holder 8 to move downwardly to a second or lower horizontal position. The cassette driving section B is disposed in a horizontal position below holder 8 and operationally engages the cassette A held in slider 2 when holder 8 is in the second or lower horizontal position. The eject lever 4 is also modified so as to provide the capability, when depressed by the user, of moving holder 8 back to the first or upper horizontal position. Of course, other arrangements could also provide the horizontal plane capability.

A summary of the basic operation of the present invention is now presented. The table 3 is normally in the fully projected position due to the fact that springs 18, 18' provide a force which is greater than the frictional forces and the damping forces (if present) provided by damping pulleys 16, 16'. A cassette A is placed on slider 2 and is held in place by the urging of leaf spring 2a. As the table 3 is moved towards the closed position, slider 2 is being moved by cords 14, 14' and pulleys 10, 10' at a faster rate than the rate of table 3. Thus, slider 2 is being moved relative to table 3. The greater relative travel of slider 2 causes it to be moved within holder 8 by the sliding engagement of guide members 2c, 2c', 2d, 2d' and guide members 8a, 8a'. It should be noted that holder 8 is in its upper or first position. When table 3 reaches the closed position, slider 2 is fully disposed within holder 8. Holder 8 with slider 2 rotates to the lower or second position, which puts cassette A into operational engagement with the cassette driving section B. Holder 8 remains in its lower or second position until the eject lever is depressed, which causes holder 8 together with slider 2 disposed therein to be moved back to the upper or first position. The table 3 automatically returns to the fully projected position because the force provided by springs 18, 18' is greater than the frictional forces and the damping forces provided by damping pulleys 16, 16'. As table 3 moves towards the fully projected position, slider 2 is moved out of sliding engagement with holder 8 and into sliding engagement with the table 3 due to the relative movement of slider 2 with respect to table 3 provided by cords 14, 14' and pulleys 10, 10'.

Figure 7:
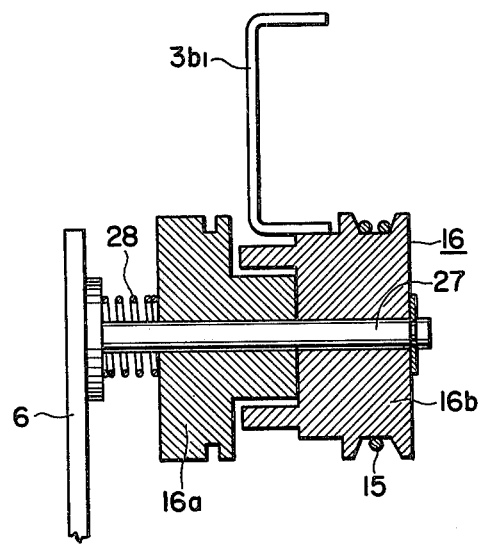
FIG. 7 is a side view partly in cross-section of an embodiment of the damping pulley of the present invention; and, FIG. 8 is a side view partly in cross-section of another embodiment of the damping pulley of the present invention.

Referring now to FIG. 7, a cross-sectional view of the embodiment of the damping pulley 16 which provides substantial damping force only when the table 3 is moved from the closed position to the fully projected position will now be described. It should be understood that the description of damping pulley 16 is equally applicable except as noted. A shaft 27 is fixed secured to side plate 6. A roller 16a and a roller 16b are disposed for rotation on shaft 27, and are urged in pressing connection with each other by a spring 28 also provided on shaft 27. A viscous resistance agent (not shown) is interposed between rollers 16a and 16.

The cord 15 is wound on the outer peripheral surface of pulley 16b. The other pulley 16a is non-rotatable, but is made to be movable in the axial direction of the shaft 27. The pulley 16b is rotatable but the peripheral portion thereof is in contact with the guide portion $3b_1$ of the table 3. With such a construction, when the table 3 is moved in the direction of the closed position, the cord 15 is loosened and slips on pulley 16b. Therefore, the only damping force provided by the pulley 16 via cord 15 to the table 15 due to the frictional force between the pulley 16b and the guide portion $3b_1$, and the slipping resistance of the cord 15 on the pulley 16b. Thus, the damping force provided by pulley 16 is at a low level. When, however, table 3 is moved in the direction of the fully projection position, pulley 16 via cord 15 provides a damping force of a high level to table 3. This high damping force is due to the fact that cord 15 is in intimate contact with the pulley 16b. In addition, pulley 16b is in pressingly contact with the unrotatable pulley 16a because of the urging of spring 28, and therefore the viscid resistance agent is interposed therebetween. This pressing contact produces the high damping force. It should be noted that the high damping force counteracts the force provided by springs 18, 18', which means that table 3 is smoothly and slowly moved to the fully projection position. The other pulley 16' has substantially the same construction and function.

Figure 8:
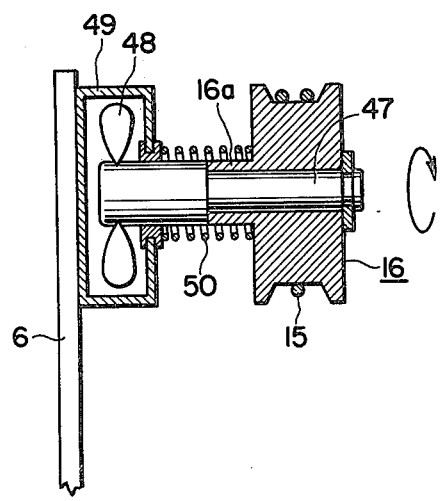

Referring now to FIG. 8, a cross-sectional view of the second embodiment of the damping pulley 16, which provides a substantial damping force only when the table 3 is moved from the closed position to the fully projected position will now be described. It should be understood that the description of damping pulley 16 is equally applicable except as noted. A propeller 48 is provided at the opposite end of the propeller shaft 47. A propeller 48 and the associated part of a propeller shaft 47 are water-tightly disposed in a fluid-sealed manner within a case 49 filled with a viscous liquid. The case 29 is mounted on the side plate 6. Reference numeral 50 designates a coil spring provided around the propeller shaft 47, and reference numeral 16a designates a portion of the pulley 16. In the above construction, the damper pulley 16 and the propeller shaft 47 are integrally connected to each other by the coil spring 50. When the coil spring 50 is rotated in the clockwise direction as viewed from the right-hand side in FIG. 8, the coil spring 50 is loosened, and when the coil spring 50 is rotated in the opposite direction, the coil spring 50 is tightened. With such a construction, the coil spring 50 serves to disengage the damper pulley 16 and the propeller shaft 47 when the coil spring 50 is rotated in the clockwise direction, and the coil spring 50 serves to engage them when the coil spring 50 is rotated in the opposite direction. Thus, a type of reversal clutch mechanism is presented. Accordingly, the damper pulley 16 is rotated clockwise when the table 3 is moved to the closed position, causing only the damper pulley 16 to be rotated. In contrast, the damper pulley 16 is rotated counter-clockwise when the table 3 is moved to the fully projected position, causing both the damper pulley 16 and the propeller 48 to be rotated. The resistance force due to the viscous liquid within the case 49 is applied to the propeller 48 when the table is moved to the fully projected position. The load is accordingly applied to the damper pulley 16, which thereby applies a large damping force via cord 15 to the table 3 when the table is moved towards the fully projected position. The other damper pulley 16' has the winding of spring 50 reversed, but has substantially the same construction and function.

In the embodiment shown in FIG. 8, the propeller 48 is rotated against the resistance force of the viscous liquid 58. Alternatively, in order to obtain a desired damping force, the propeller shaft 47 may be in abutment with another resistance member. For example, propeller 47 may be made of a material which exhibits a rotational resistance.

What is claimed is:

1. A cassette tape transport mechanism comprising:
   (a) conveying means adapted to receive a cassette for conveying said cassette reciprocally in opposite directions between a first position and a second position;
   (b) auxiliary conveying means mechanically coupled to said conveying for movement relative thereto and adapted for reciprocal movement in the same two directions, respectively, as said conveying means for moving said conveying means a greater distance than said auxiliary conveying means; and,
   (c) maintaining means for maintaining said conveying means in said second position when said conveying means is moved to said second position.

2. A cassette tape transport mechanism as recited in claim 1, further comprising holder means capable of moving between a wait position and a play position, said holder adapted to receive said conveying means as said conveying means is moved to said second position, wherein said maintaining means maintains said holder means in said play position when said conveying means is in said second position.

3. A cassette tape transport mechanism as recited in claim 2, wherein said auxiliary conveying means includes a pulley mounted for rotation, and a cord wrapped around said pulley and having a first portion secured to said conveying means and having a second portion secured to said holder means.

4. A cassette tape transport mechanism as recited in claim 3, comprising means for adjusting the effective length of said cord so as to change the relative movement of said conveying means with respect to said auxiliary conveying means.

5. A cassette tape transport mechanism as recited in claim 1, further comprising a side plate adapted to movably support said auxilliary conveying means, and wherein said auxiliary conveying means includes damping pulley means rotatably mounted to said side plate for providing a high level damping force only when said auxiliary conveying means is moved in the direction of said first position, and a cord having a first portion and a second portion secured to said auxiliary conveying means on opposite sides of said damping pulley means.

6. A cassette tape transport mechanism as recited in claim 5, wherein said damping pulley means includes a propeller provided at a first end of a propeller shaft, said propeller and associated portion of said propeller shaft disposed for fluid-sealed rotation in a case containing a viscous liquids, said case mounted to said side plate, a damper pulley mounted for rotation on a second end portion of said propeller shaft and integrally connected to said propeller shaft by a coil spring wound about said propeller shaft, said coil spring wound in the direction such that said coil spring is tightened when said auxiliary conveying means is moved in the direction of said first position.

7. A cassette tape transport mechanism as recited in claim 5, further comprising leaf spring means interposed between said auxiliary conveying means and said secured portion of said cord in the direction of said second position for providing a reduction in tension on said cord only when said auxiliary conveying means is moved in the direction of said second position, and wherein said damping pulley means includes a shaft fixed to said side plate, an inner pulley disposed on said shaft for axial movement, an outer pulley mounted for rotation on said shaft, a viscous resistance agent provided between said inner pulley and said outer pulley, and a spring wound on said shaft and interposed between said side plate and said inner pulley for urging said inner pulley into engagement with said outer pulley.

8. A cassette loading mechanism for a front-loaded cassette tape deck, said mechanism having an open, loading position and a closed, playing position, and holder means for holding the cassette in the closed, playing position, said mechanism comprising:
   a stationary housing having a front opening;
   table means for inserting and removing a cassette from the deck and mounted in said opening for reciprocal movement between the open, loading position and the closed, playing position, said table means projecting outwardly from the front of said housing in the open, loading position;
   slider means for receiving a cassette and mounted on said table means for reciprocal movement relative thereto and to said housing for transporting the cassette into and out of the holder means; and
   pulley and cable means coupled to said table means and to said slider means for causing said table means and slider means to move together in the same direction between said open and closed positions, said slider means moving relative to, and at a speed greater than, said table means, so that, for a given distance traveled by said table means, said slider means travels a distance greater than said given distance.

* * * * *